(12) United States Patent
Gonzaga et al.

(10) Patent No.: US 8,910,693 B2
(45) Date of Patent: Dec. 16, 2014

(54) DEVICE FOR DEMOUNTING A TIRE FROM A RIM AS WELL AS A TIRE DEMOUNTING MACHINE EQUIPPED WITH SUCH DEVICE

(75) Inventors: Tullio Gonzaga, Reggio Emilia (IT); Silvano Santi, Bologna (IT)

(73) Assignee: Butler Engineering & Marketing S.p.A., Reggio Emilia (IT)

( * ) Notice: Subject to any disclaimer, the term of this patent is extended or adjusted under 35 U.S.C. 154(b) by 348 days.

(21) Appl. No.: 13/315,349

(22) Filed: Dec. 9, 2011

(65) Prior Publication Data

US 2012/0145333 A1    Jun. 14, 2012

(30) Foreign Application Priority Data

Dec. 9, 2010  (IT) .............................. VR2010A0233

(51) Int. Cl.
*B60C 25/138* (2006.01)
*B60C 25/05* (2006.01)

(52) U.S. Cl.
CPC ........... *B60C 25/138* (2013.01); *B60C 25/0578* (2013.04)
USPC ....................................... 157/1.22; 157/1.17

(58) Field of Classification Search
USPC ................. 157/1.1, 1.17, 1.22, 1.24
See application file for complete search history.

(56) References Cited

U.S. PATENT DOCUMENTS

| 7,128,119 | B2 * | 10/2006 | Corghi | 157/1.22 |
| 8,291,958 | B2 * | 10/2012 | Bartoli | 157/1.24 |
| 2010/0089538 | A1 * | 4/2010 | Bonacini | 157/1.22 |
| 2011/0155329 | A1 * | 6/2011 | Magnani | 157/1.17 |

FOREIGN PATENT DOCUMENTS

| EP | 2 174 807 A1 | 4/2010 |
| EP | 2 233 325 A1 | 9/2010 |
| WO | 2010/026539 A1 | 3/2010 |

OTHER PUBLICATIONS

European Search Report accompanied by a Statement with regard to novelty, inventive step or industrial applicability, Italian Patent Office, Jul. 18, 2011.

* cited by examiner

*Primary Examiner* — Hadi Shakeri
(74) *Attorney, Agent, or Firm* — Tutunjian & Bitetto, P.C.

(57) ABSTRACT

The present invention relates to a device for demounting a tire (T) from a rim (W)
 including at least one support element;
 an articulation pin element borne by the at least one support element;
 a spring shackle element having a first end and a second end articulated on the articulation pin;
 a demounting lever;
 an actuator borne by the at least one support element and set to act on the demounting lever in order to make the demounting lever angularly move during use; and
 friction or elastic loading means designed to slow the angular movement of the spring shackle element around the articulation pin with respect to its angular movement around the first axis (x-x).

25 Claims, 12 Drawing Sheets

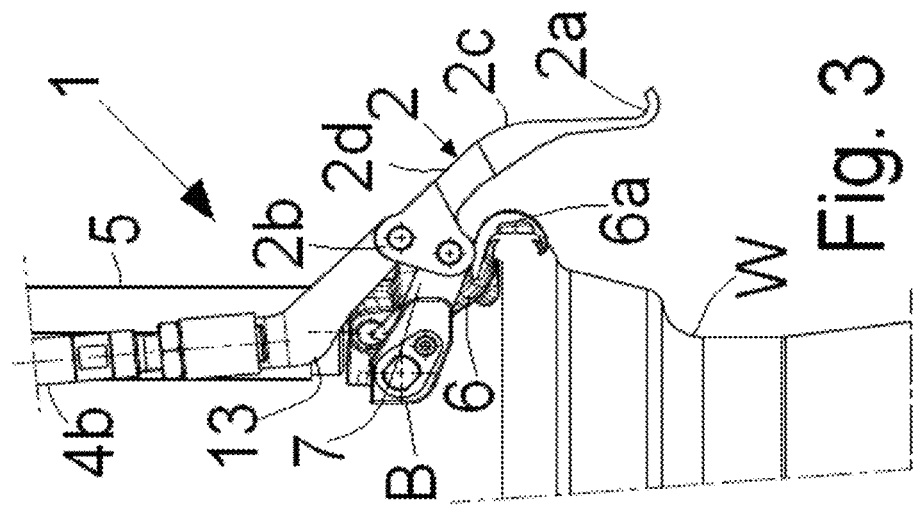
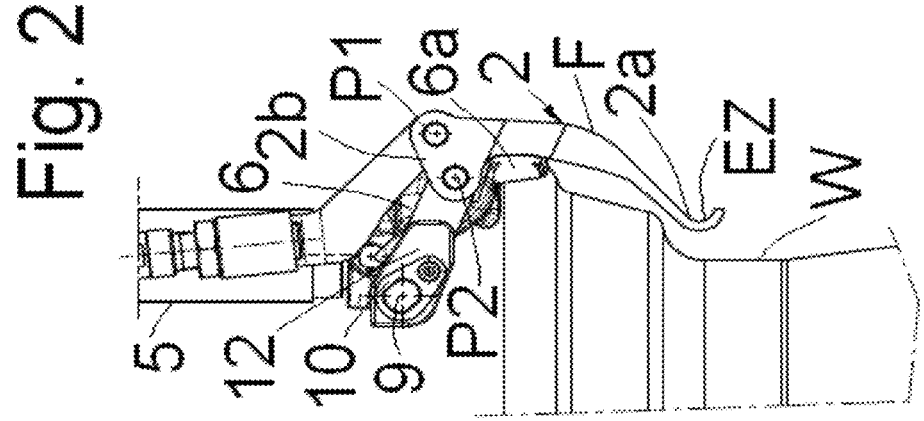
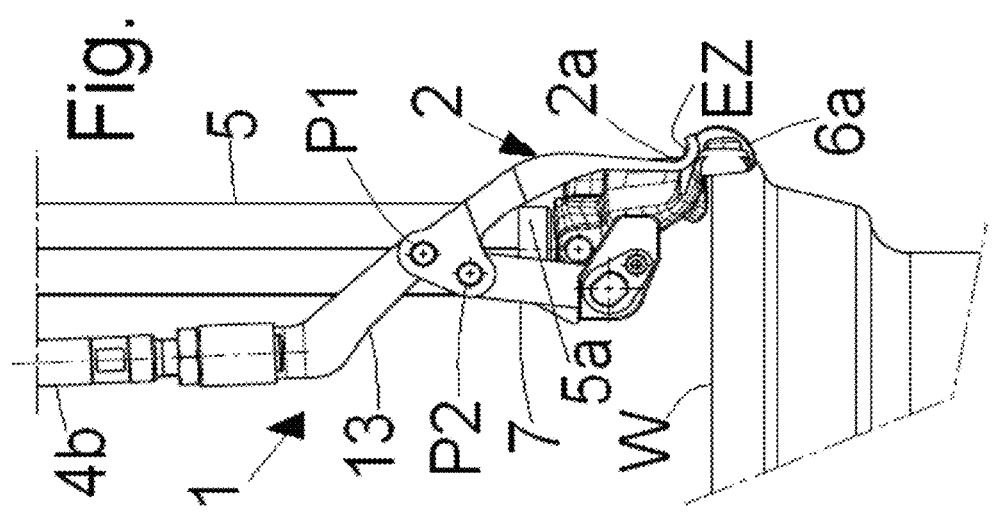

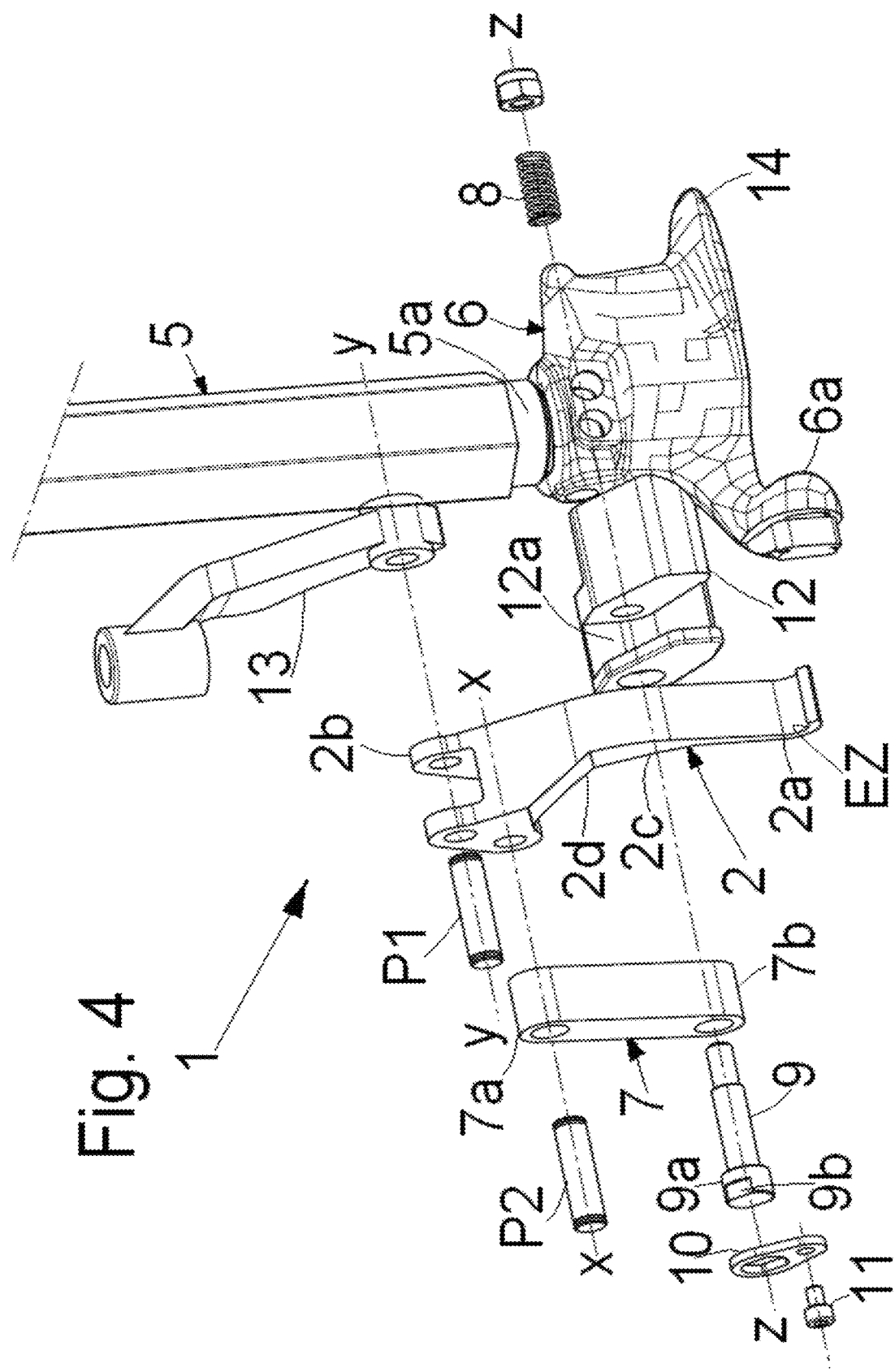

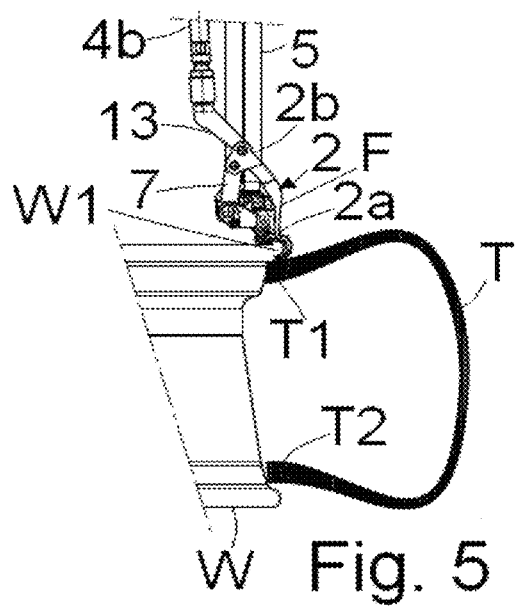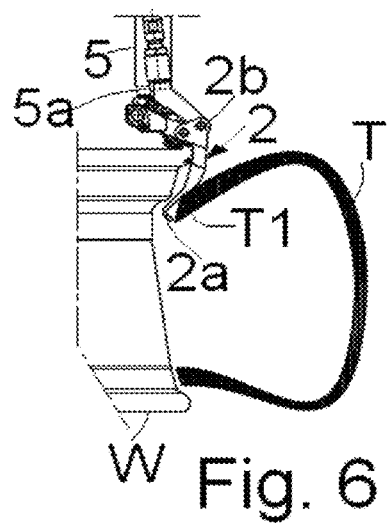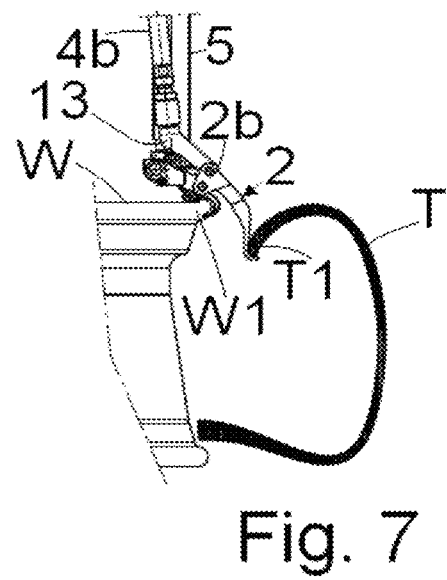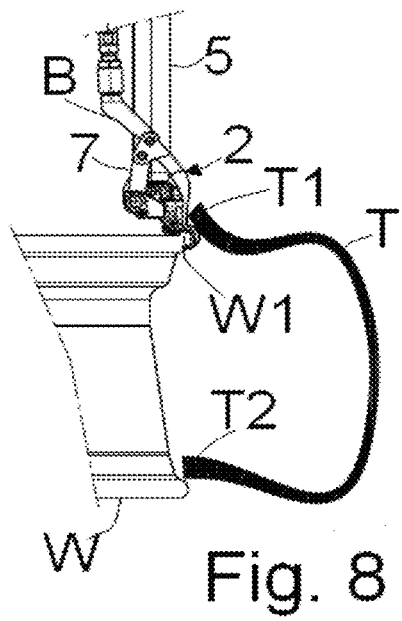

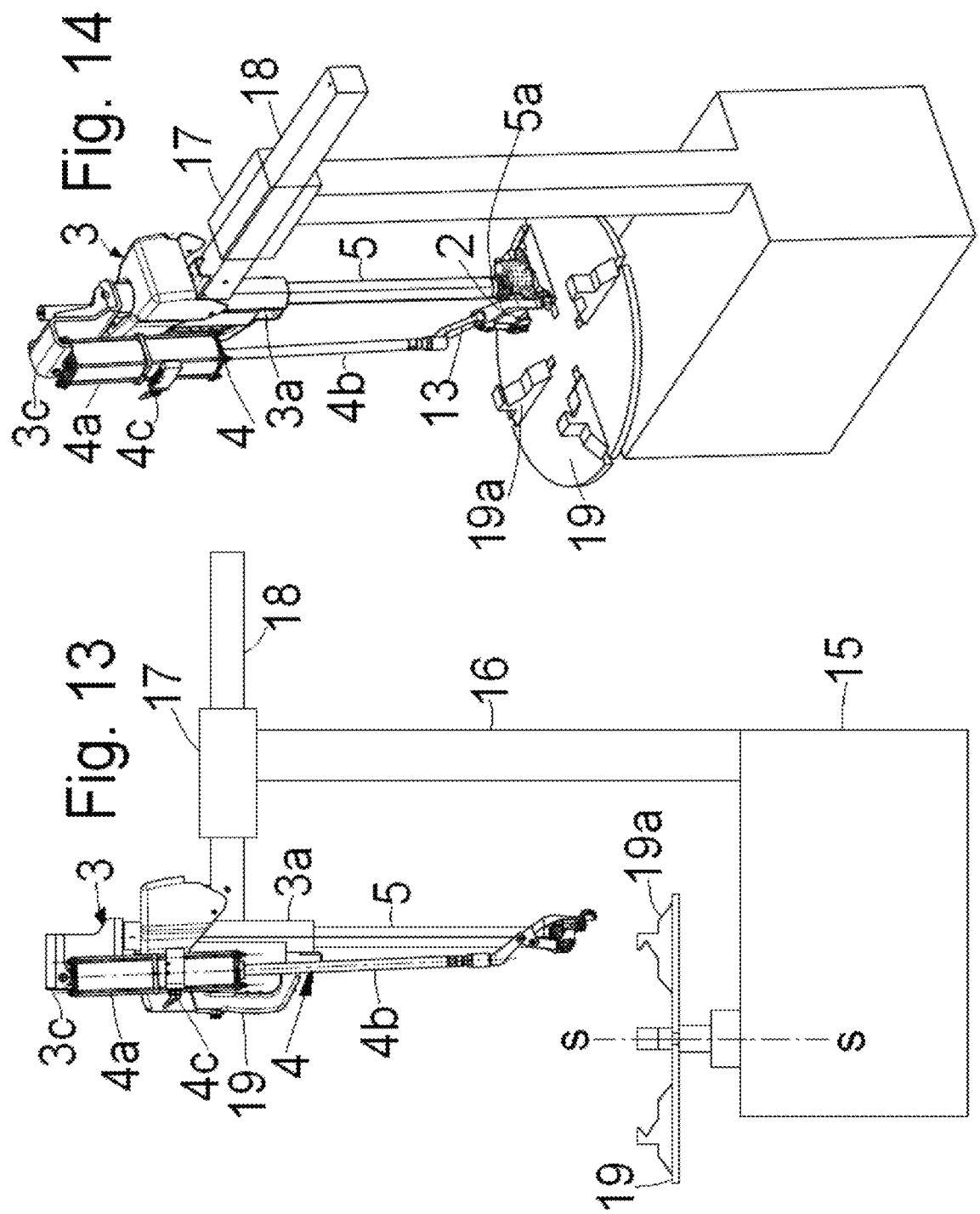

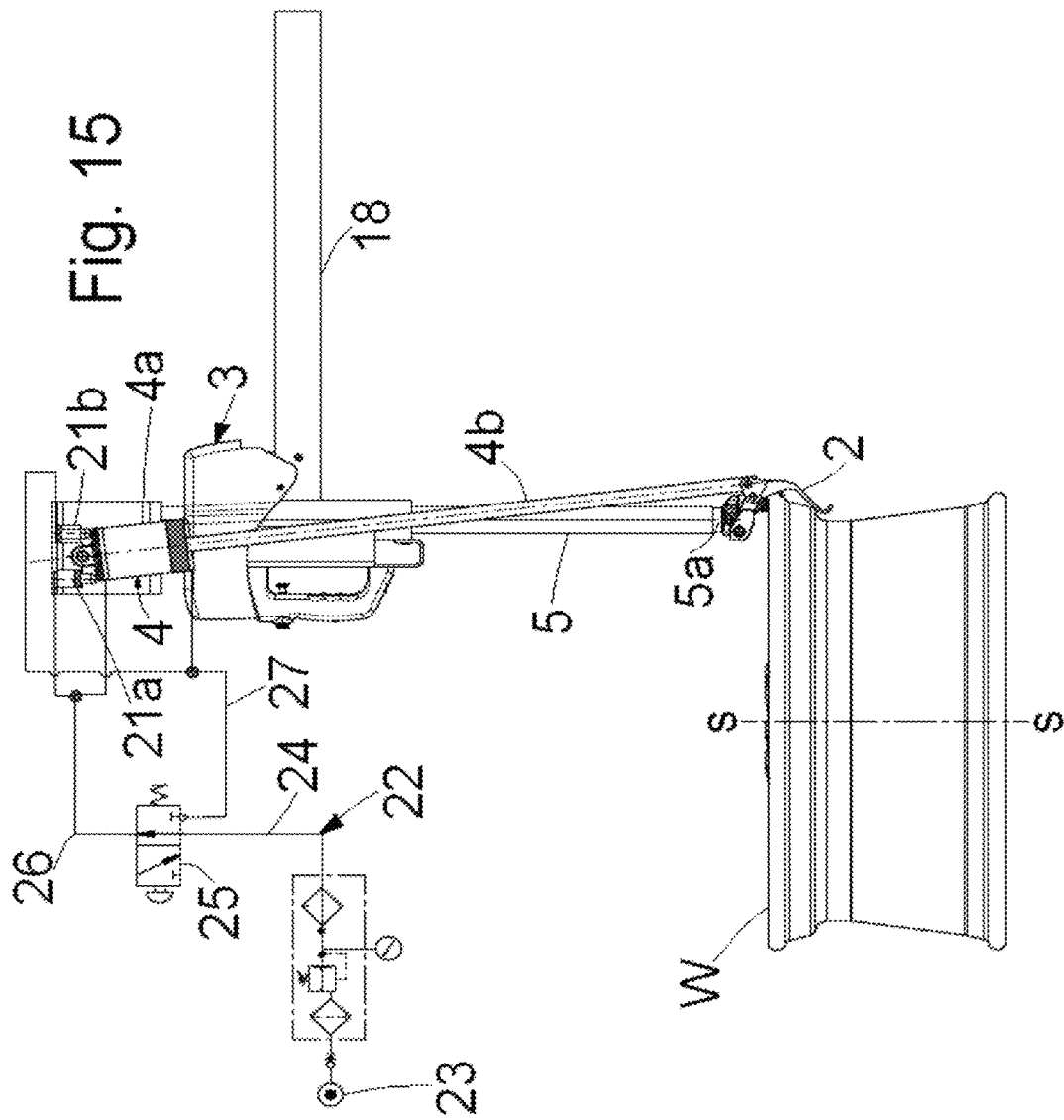

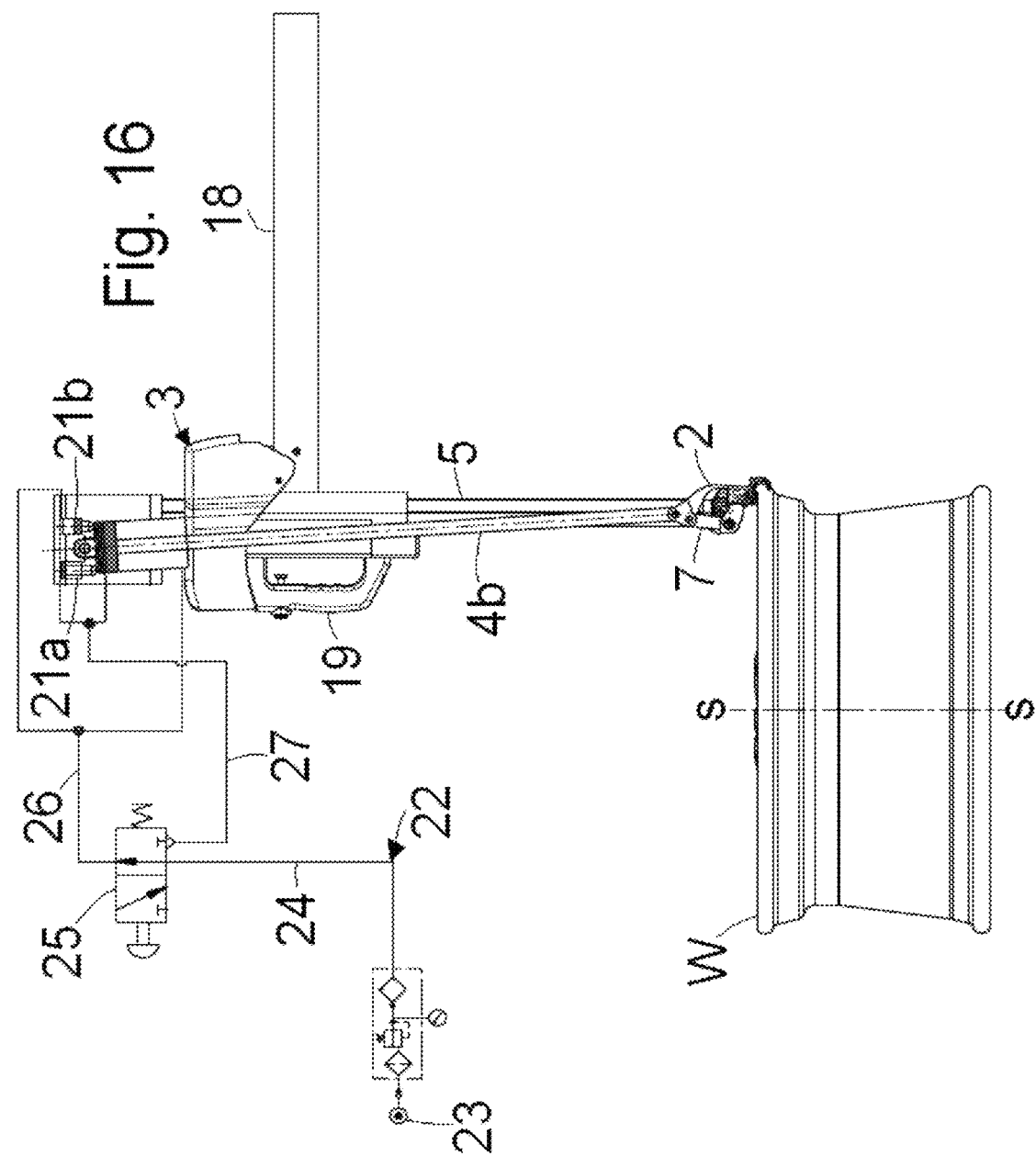

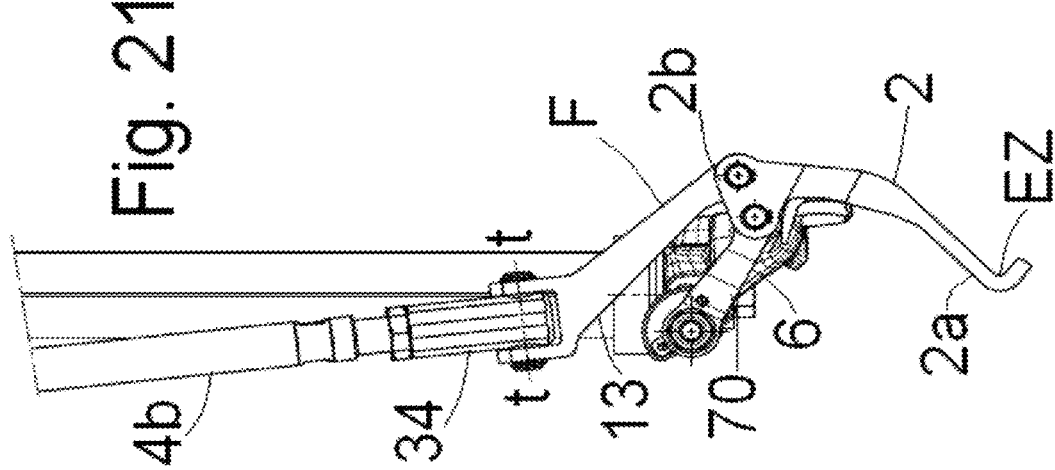
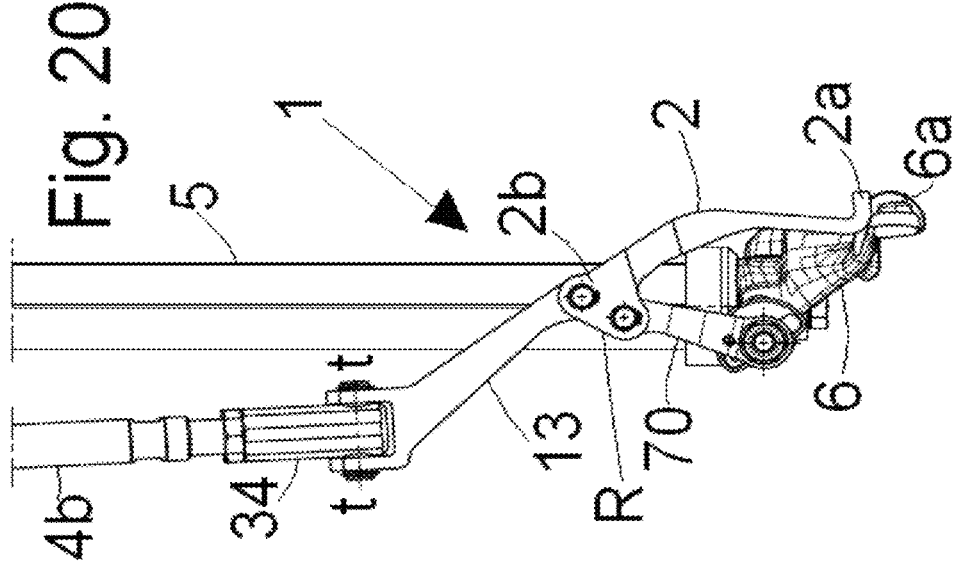

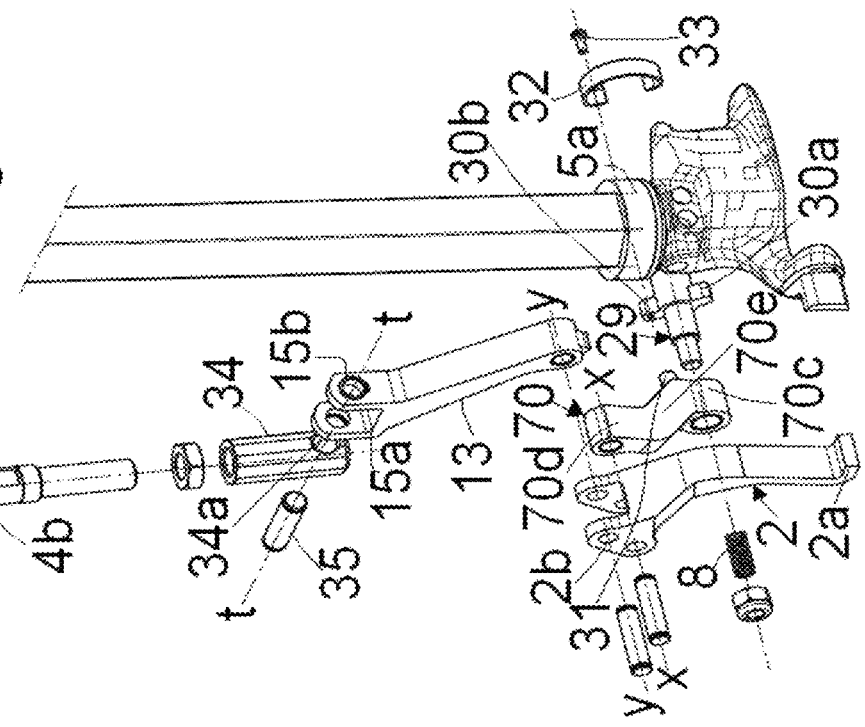
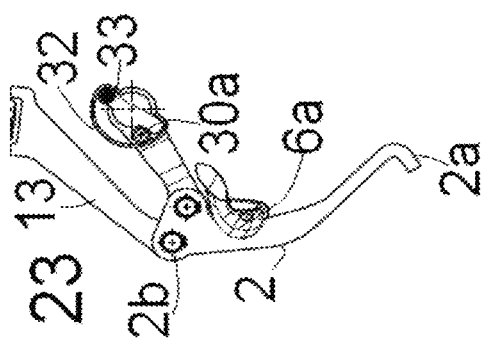
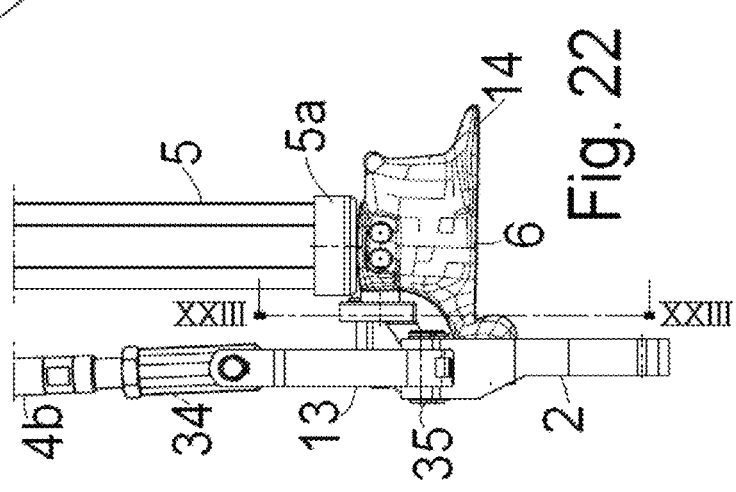

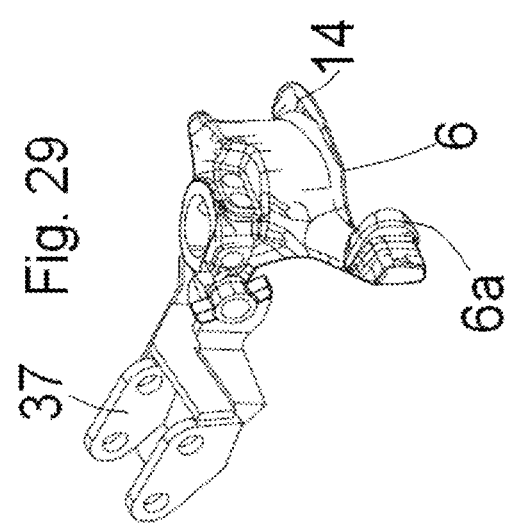
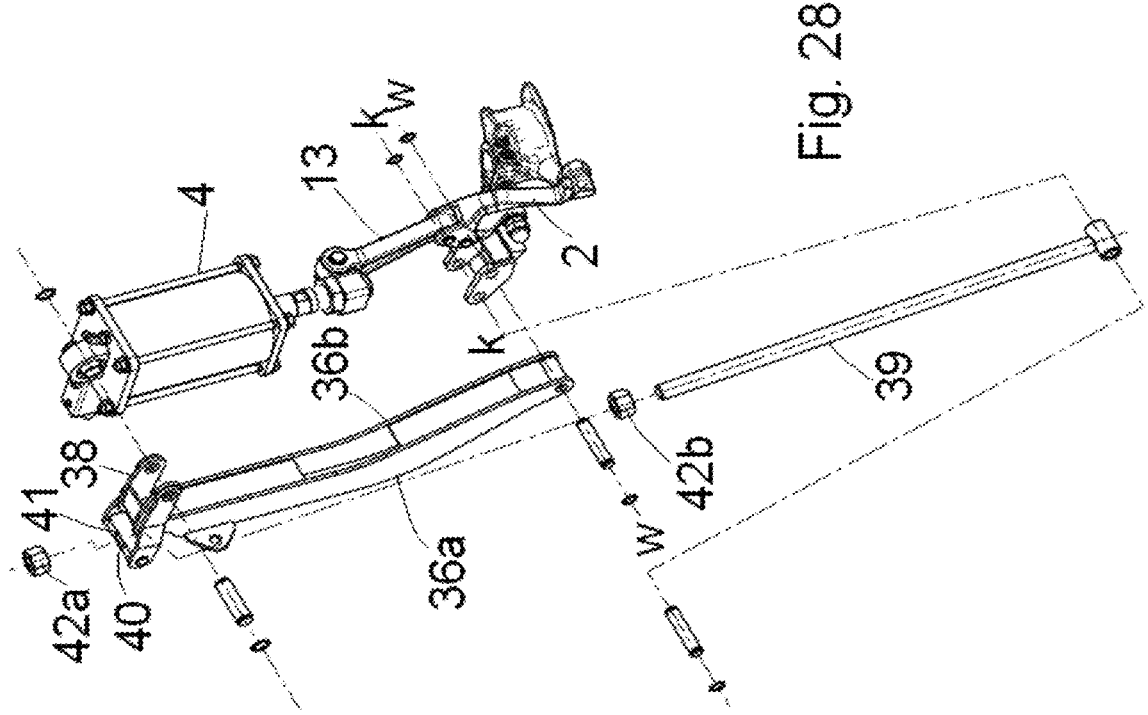

DEVICE FOR DEMOUNTING A TIRE FROM A RIM AS WELL AS A TIRE DEMOUNTING MACHINE EQUIPPED WITH SUCH DEVICE

FIELD OF INVENTION

The present invention regards a demounting device or tool for a tire demounting machine, a tire demounting machine equipped with one such device, as well as a new process for demounting a first or second bead of a tire from a rim.

BACKGROUND OF INVENTION

The conventional tire mounting-demounting machines usually comprise, as is known, a base, a wheel-holder table rotatably mounted on the base, a (column) support which is extended from the base and one or more tool support arms, such as the so-called mounting-demounting tool, and one or a pair of bead breaker rollers and the like.

Up to now, several demounting tools have been proposed, equipped (or not equipped) with respective anchoring device to a support arm.

The patent IT-1 342 902, for example, teaches a tire demounting machine equipped with device or tool for demounting a tire from a rim. The machine is equipped with a telescopic arm, vertical during use, which on its lower part supports a block intended to be laterally abutted against an edge of the rim of a tired wheel. The following are arranged at different levels at the block: an upper extractor lever and a lower bead breaker lever pivoted at the lower part of the block. The articulation between the extractor lever and the block occurs by means of a pair of "small connecting rods" of different length, pivoted at their upper portion to a respective intermediate position of the extractor lever and at their lower part, at two different levels, to the block, so as to define an articulated quadrilateral structure therewith and with the extractor lever. A first double-acting fluid operated linear actuator, being extended transversely to the telescopic arm, is set to command the extractor lever, and a second actuator commands the angular movement of the bead breaker lever. First, the bead breaker lever is actuated—this is forced against the bead of the tire in order to carry out the bead breaking. Once the bead breaking is completed, the actuator of the extractor lever is actuated, which is forced to penetrate between the edge of the rim and the bead of the tire close to the bead breaker lever. By reversing the movement direction of the actuator of the extractor lever, the latter is forced to move backward, taking the bead of the tire with it beyond the edge of the rim, so as to carry out the extraction thereof. Once extraction has occurred, both levers are moved back into rest position.

The patent EP-1 593 533 teaches a tire mounting-demounting machine equipped with a vertical arm, which on its lower part supports a mounting-demounting tool, to which an extraction lever is laterally articulated. The articulation of the extraction lever to the tool is achieved by means of an articulated quadrilateral and the lever is actuatable by a jack by means of a crank gear. The extraction tool carries out the bead breaking before the extractor lever is actuated.

As will be understood, the conventional extraction devices for tire mounting-demounting machines have rather complex structures and are thus costly; they also require suitably trained personnel for the correct use thereof.

The European patent application EP-2 233 325 teaches a tire assembling-release machine provided with a tool for dismounting a tire from a wheel rim.

The machine is provided with a vertical, in use, arm supporting a work head, an extracting lever pivoted to the work head, and a linear actuator, which protrudes downwards from an upper portion of the work head.

More particularly, the extracting lever is articulated to the work head by means of two connecting rods; the actuator, the extracting lever and the connecting rods forming an articulated quadrilateral structure.

Owing to such quadrilateral structure, upon operation of the actuator in one direction, the extracting lever is caused to move along a first insertion path, whereas should the actuator be operated in the opposite direction, the extracting lever is displaced along a second extraction path, which differs from the first insertion path.

The machine disclosed in EP-2 233 325 has a complex structure expensive to be manufactured.

SUMMARY OF THE INVENTION

The main object of the present invention is to provide a demounting device which has very simple structure and which allows carrying out demounting operations in a quick and efficient manner.

Another object of the present invention is to provide a demounting device which is suitable for carrying out the demounting of both beads of a tire from a rim.

Another object of the present invention is to provide a tire mounting-demounting machine equipped with a new demounting device which allows easily and quickly achieving tire demounting operations.

Another object of the present invention is to provide a new method for demounting both beads of a tire without having to overturn the rim.

According to a first aspect of the present invention, a device for demounting a tire from a rim is provided, comprising:
  at least one support element;
  an articulation pin element borne by the at least one support element;
  a spring shackle element having a first end and a second end articulated on the articulation pin;
  a demounting lever having a substantially hook-like distal end and a proximal end that can be articulated at a first articulation axis to the first end of the spring shackle element and a second articulation axis parallel to the first articulation axis, the first and the second articulation axis being substantially parallel to the articulation pin; and
  an actuator borne by the at least one support element and set to act along the articulation axis of the demounting lever in order to make the demounting lever move angularly, during use, around the first articulation axis; the actuator also making the spring shackle move angularly around the articulation pin, whereby following the driving of the actuator in one direction, the lever being forced to follow a first path or insertion path, whereas by driving the actuator in the reverse direction, the demounting lever is forced to follow a reverse path or extraction path, different from that of the first path, and
  friction or elastic loading means at the articulation around the articulation pin of second end of the spring shackle element, designed to slow the angular movement of the spring shackle element around the articulation pin with respect to its angular movement around the first axis.

According to another aspect of the first invention, a tire mounting-demounting machine is provided including a base, a wheel-holder table rotatable around a rotation axis supported by the base, and a column extending from the base and supporting at least one tool-holder arm, the machine comprising a demounting device according to the present invention; the support element being supported by the tool-holder arm.

According to a third aspect of the present invention, a process for demounting a tire from a rim by means of a device according to the present invention is provided, comprising the following steps:
   bead breaking a first bead of the tire;
   arranging the demounting device at a first flank of the rim corresponding with the first bead, so as to bring the distal end of the demounting lever to a first edge of the rim;
   commanding the actuator so as to determine an angular advancement course of the demounting lever towards a position of penetration of its own distal end between the edge of the rim and the tire, until it internally engages a portion of the tire bead close to the rim at the advancement end stop; then, it carries out a reverse course in order to deform a portion of the tire bead, moving it away from the edge of the rim before dragging it off the rim for the demounting, the advancement course being different from the reverse course; and
   completing the demounting by rotating the rim or the device.

According to a fourth aspect of the present invention, a process for demounting a tired wheel equipped with a tire mounted on a rim is provided, comprising the following sequential steps:
   providing a device for demounting a tire from a rim, comprising:
      at least one support element;
      an articulation pin element borne by the at least one support element;
      a spring shackle element having a first end and a second end articulated on the articulation pin;
      a demounting lever having a substantially hook-like distal end and a proximal end that can be articulated at a first articulation axis to the first end of the spring shackle element and at a second articulation axis parallel to the first articulation axis, the first and second articulation axis being substantially parallel to the articulation pin; and
      an actuator borne by the at least one support element and set to act on the second articulation axis of the demounting lever in order to make the demounting lever angularly move during use around the first articulation axis and make the spring shackle element angularly move around the articulation pin, such that after the driving of the actuator in one direction, the lever is obliged to follow a first path or insertion path, while by driving the actuator in the reverse direction, the demounting lever is obliged to follow a reverse or extraction path, different from the first path;
   bead breaking a first bead of a tire on a first flank of a tired wheel and bringing the first bead beyond the respective first edge of the rim;
   bringing the device closer to the first flank of the tired wheel;
   commanding the actuator so as to cause the angular movement of the spring shackle element around the articulation pin and of the lever around the first axis, such that the lever is inserted between a portion of the second bead of the tire and a portion of the first edge of the rim and grasps an external portion of the second bead;
   commanding the actuator so as to:
   initially cause the angular movement of the lever around the first axis, while the spring shackle element remains in position with respect to the support element, such that the free end of the lever is moved away from the first edge of the rim, bringing a portion of the second bead therewith, and
   then causing the reverse angular movement of the spring shackle element around the articulation pin and the return of the lever into initial position, the insertion path of the demounting lever being different from the return path thereof;
   so as to bring the portion of the second bead beyond the first edge of the rim and the device in the initial position; and
   rotate the rim or the device.

BRIEF DESCRIPTION OF THE DRAWINGS

Further aspects and advantages of the present invention will be clearer from the following detailed description of specific embodiments of a demounting device, such description made with reference to the accompanying drawing, in which:

FIGS. 1-3 are side elevation views of a demounting device according to the present invention in different work positions close to a rim;

FIG. 4 is an exploded view of the components of the device of FIGS. 1-3;

FIGS. 5-8 illustrate the sequence of the demounting steps of a first tire bead from a rim by means of the device of FIGS. 1-4;

FIGS. 13 and 14 are respectively slightly top side and perspective views of a tire mounting-demounting machine equipped with a demounting device according to the present invention;

FIGS. 15 and 16 are side views, with parts schematically represented, of another embodiment of a tire mounting-demounting machine according to the present invention;

FIGS. 20 and 21 are side elevation views of another demounting device embodiment according to the present invention in different work positions;

FIG. 22 is a front view of the device of FIGS. 20 and 21;

FIG. 23 is a section view taken along the trace XXIII-XXIII of FIG. 22;

FIG. 24 is an exploded view of the device of FIGS. 20 and 21;

FIG. 28 is an exploded view of the device of FIGS. 25 to 27; and

FIG. 29 is a perspective view of the block element of the device of FIGS. 25 to 27.

In the drawing set, equivalent or similar components or parts were marked with the same reference numbers.

DETAILED DESCRIPTION OF THE PREFERRED EMBODIMENTS

Figure 9:
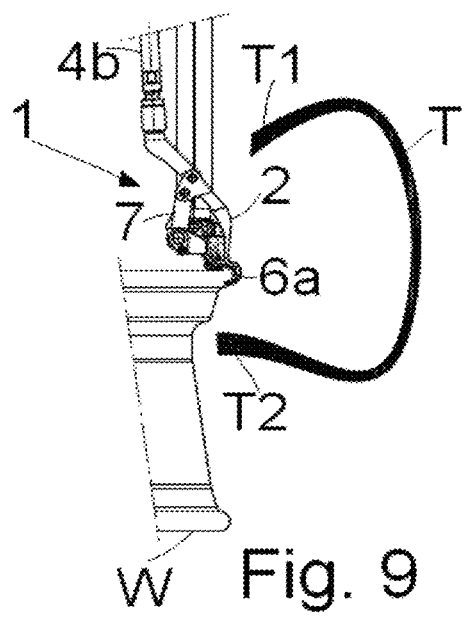
FIGS. 9-12 illustrate the sequence of the demounting steps of the other or second tire bead from the same rim by means of the device of FIGS. 1-4.
Figure 10:
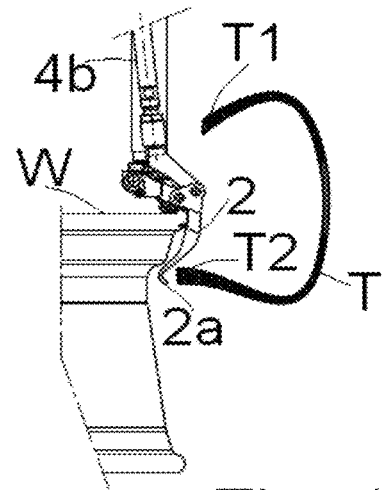
Figure 11:
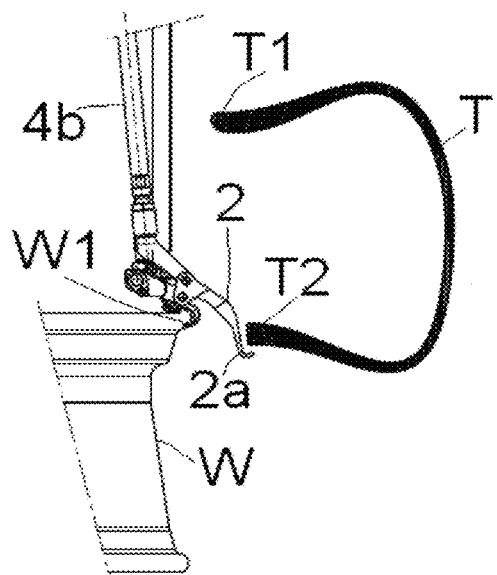
Figure 12:
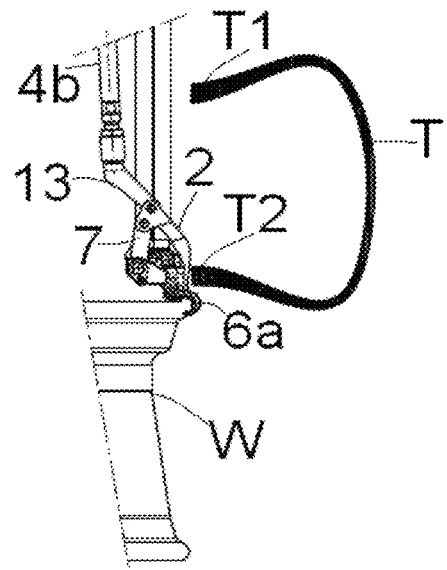

First, with reference to FIGS. 1-14, a demounting device 1 is illustrated according to the present invention for a tire mounting-demounting machine which comprises a demounting lever 2 having a distal free end 2a that is substantially-curved or hook-like and a proximal end 2b, one or more support elements 3 (FIGS. 13 and 14), an actuator 4, such as a linear actuator, e.g. pneumatic or hydraulic, equipped with cylinder 4a pivoted to the support element 3 and a stem 4b slidably mounted in the cylinder 4a. If the device 1 is mounted on a machine equipped with a wheel-holder table with substantially vertical rotation axis, the actuator 4 preferably has substantially vertical position. Control means can be provided for the extension or retraction of the stem 4b, drivable by means of a button or the like 4c.

The device is also provided with a spring shackle element 7 including a first 7a and a second 7b end. The first end 7a of the spring shackle element 7 is intended to be articulated to the proximal end 2b of the demounting lever 2 at a first articulation axis x-x, while the second end 7b is intended to be articulated to at least one support element or to a component thereof around a third axis z-z, more particularly on an articulation pin 9 parallel to the first x-x and second y-y axis.

The proximal end 2b of the demounting lever 2 can be articulated to the linear actuator 4 at a second articulation axis y-y, parallel to the first articulation axis x-x, such that the linear actuator 4 is set to operate on the proximal end 2b and thus on the second articulation axis y-y of the demounting lever 2 in order to angularly move the demounting lever 2 around the first articulation axis x-x and the spring shack element 7 around the articulation pin 9 during use. In such a manner, as will be seen below, following the driving of the actuator in one direction, the lever 2 is obliged to follow a first path or insertion path between the tire and the rim, while by driving the actuator in reverse, the demounting lever 2 is obliged to follow a backwards path or path of extraction of the tire bead, different from the first path.

The driving of the actuator is such to angularly move, during use, the demounting lever 2 to and from a zone between rim W and tire T of the wheel to be demounted.

The support element can include a support arm 5, preferably substantially vertical, which has a work end 5a positionable at a flank of the rim W. The support arm 5 can have a block element 6 mounted on the end 5a, which in the embodiment illustrated in the Figures is the distal end (lower end in the Figures) with respect to the support element 3. The pin 9 is brought to the work end 5a of the support arm 5.

In a device according to the present invention, therefore, the demounting lever 2, at the proximal end thereof 2b, is pivoted both to the actuator 4, in particular to the stem 4b, by means of a pin P1 arrange along the axis y-y according to the embodiment illustrated in the Figures, and to the first end 7a of the spring shackle element 7, by means of a pin P2 arranged along the first axis x-x according to the embodiment illustrated in the Figures, and for such purpose can have slightly enlarged proximal end 2b. As will be noted, the remaining part of the lever 2 is preferably substantially free or lacking constraints, in the sense that other pivots or articulations of the lever to other components of the device or of the machine on which the same is mounted are not provided for; such articulations are instead provided for in the device taught by the patent IT-1 342 902. Preferably, therefore, the lever 2 is only pivoted along two articulation axes x-x, y-y, both at the proximal end 2b thereof.

Friction means or elastic loading means are also provided for which act on the second end 7b of the spring shackle element 7, such as a spring 8 mounted on the pin element or articulation pin 9 for articulating the spring shackle element 7 to the block element 6, such spring intended to oppose angular movements of the spring shackle element 7 with respect to the block element 6.

More particularly, the spring 8 is intended to oppose angular movements of the spring shackle element 7 with respect to the support arm 5, or if provided, with respect to the block element 6, and the same spring can be mounted around the pin element 9 and maintained tight against it.

The pin element 9 can be anchored to the block element 6, and for such purpose it can have a suitably sized head 9a so as to be shape-coupled with a template 10, which in turn is fixed to the block element 6 by means of a pawl 11. According to the embodiment illustrated in the Figures (see FIG. 4 in particular), the head 9a of the pin element 9 has a substantially cylindrical configuration with one or a pair of substantially parallel notches or grooves 9b obtained from the free end of the pin element 9.

The block element 6 can comprise a protuberance 6a which is extended towards and substantially transversely to the demounting lever 2. As will also be stated below, the demounting lever 2, in rest conditions, can be based on the protuberance 6a, while in work conditions, or better yet during the extension of the stem 4b of the actuator 4, it can slide on the protuberance 6a. For such purpose, the protuberance 6a has an external edge, i.e. that on which the demounting lever 2 slides, and an internal edge, i.e. that intended to rest on the rim, which are substantially curved.

According to the embodiment illustrated in the Figures, the protuberance 6a has a first section transverse to the demounting lever 2 and hence a free end tilted about 90° with respect to the first section.

The block element 6 can then include a spacer member or flange portion 12 which delimits a channel in which the pin element 9 is insertable and fixable. The spacer member 12 can have a fork-like cavity 12a for the articulation of the end 7b. In such case, the end 7b of the spring shackle element 7 is arranged at the fork-like cavity 12a and then the pin element or articulation pin 9 is inserted both through the fork-like cavity 12a of the spacer member 12 and through the end 7b of the spring shackle element 7. As will be understood, due to the configuration of the fork-like cavity 12a, the spring shackle element 7 can oscillate between a first, substantially vertical position (see FIG. 1) and a second overturned position in which it is situated in abutment against the seat of the fork-like cavity 12a itself (see FIG. 3). The fork-like cavity 12a, therefore, constitutes a confinement means for the angular movement of the spring shackle element 7.

A drive arm 13 can also be provided for, such as a L-configured bar element, which for example is anchored on one side to the tip of the step 4b and pivoted on the other side to the proximal end 2b of the demounting lever 2.

According to the embodiment illustrated in the Figures, the proximal end 2b of the demounting lever 2 is configured as a fork; between the prongs thereof, a respective drive arm 13 is housed and anchored during use. The distal end 2a instead delimits a cradle-shaped engagement zone EZ for a bead portion of a tire.

The demounting lever 2 can also comprise, from the proximal end 2b to the distal end 2a, a substantially flat intermediate section 2c, then a slightly curved section 2d with concavity turned towards the back B of the device (i.e., during use, in the direction of the rotation axis of the wheel to be demounted) or towards the pin element 9, terminating in the distal end 2a tilted 90° with respect to the section 2d but with concavity turned towards the front F of the device (i.e., during use, away from the axis of the tired wheel) or in the opposite direction from the pin element 9.

The device can also be equipped with one or more mounting tools 14 being extended from the block element 6, but with one portion opposite that of engagement of the demounting lever 2.

According to the embodiment illustrated in the Figures, the device is mounted on a conventional tire mounting-demounting machine, including a base 15, a column 16 extending from the base 15 and supporting a tool-holder arm, e.g. overhanging 18, for example by means of a sleeve 17 in which the arm 18 is slidably mounted. Then, a wheel-holder or support table 19 is provided for, e.g. equipped with claws 19a, for a tired wheel or a rim and having rotation axis s-s, which as will be understood corresponds during use to the rotation axis of the tired wheel or rim. Preferably, the axes y-y, x-x and z-z are substantially orthogonal to the axis s-s.

More particularly, the support element 3 can comprise a bush 3a, e.g. substantially vertical, supported by the arm 18 and in which the substantially vertical support arm 5 is slidably mounted. On the bush 3a, a handle 19 can also be fixed, by means of which the operator can control the movements of the device during the demounting and mounting steps of a tired wheel. It will be understood that the support arm could be part of a different support element, independent from element indicated with 3, e.g. being directly extended from the column 16 or from another support.

According to the embodiment illustrated in the Figures, the support element 3 then comprises a suitably curved bracket 3c to which the cylinder 4a is pivoted, preferably at an upper end thereof (upper during use).

In order to demount a tired wheel comprising a tire T mounted on a rim W with demounting device 1 according to the present invention, one first bead breaks a first bead T1 of a tire T placed on a first flank of a tired wheel. At this point, one moves the device 1 close to the first flank of the tired wheel, so as to bring the demounting lever 2 to a respective portion of a first edge W1 of the rim W. Preferably, during such step, the end 2a or—if the device 1 is equipped with this—the protuberance 6a is brought against or abutted against a respective portion of a first edge W1 of the rim W (see FIG. 5).

Then, the extension of the stem 4b of the linear actuator 4 is commanded so as to determine an angular advancement course of the demounting lever 2 towards a position of insertion of its distal end 2a between edge W1 of the rim W and bead T1 of the tire T, until it internally engages the edge of the tire close to the rim at the advancement end stop; then, it carries out a reverse course in order to deform the bead T1 of the tire T, moving the bead away from the edge W1 of the rim W before dragging it off the rim for the demounting.

With particular reference to the embodiment illustrated in the Figures, the actuator is initially commanded in a manner such to extend the stem 4b, so as to determine the angular movement (around the axis z-z) of the spring shackle element 7 with respect to the support arm 5 or, if it is provided, with respect to the block element 6 and of the demounting lever 2 with respect to the spring shackle element 7 (around the axis x-x), in such a manner that the demounting lever 2 is inserted between the tire T and the rim W and (internally) grasps a respective portion of the first bead T1 at the cradle-shaped engagement zone EZ of the distal end 2a of the demounting lever 2. During such step, the demounting lever 2, or better yet its face turned towards the back B (i.e. the face turned towards the rim W axis), slides along the edge of the rim, or if provided along the protuberance 6a or better yet along the edge of the same opposite the edge of abutment on the rim W (see FIG. 6).

At this point, the retraction of the stem 4b is commanded, so as to initially determine the angular movement of the lever 2 with respect to the spring shackle element 7, while the spring shackle element 7 remains in position with respect to the support arm 5, or, if provided, of the block element 6 (due to the action exerted by the friction or elastic loading means), such that the free end 2a of the lever 2 is moved away from the edge W1 of the rim W, bringing the grasped portion of the first bead T1 therewith (see FIG. 7). Continuing to command the retraction of the stem 4b, the reverse angular movement is then caused of the spring shackle element 7 with respect to the block element 6 (the opposing action of the friction means is therefore overcome), as well as an angular movement (in the same direction imparted during the insertion or penetration step) of the lever 2 with respect to the spring shackle element 7 (see FIG. 8), hence bringing the lever into the initial position. In such a manner, a portion of the first bead T1 is brought beyond the respective edge W1 of the rim W and the device 1 in the initial position. In order to complete the demounting of the first bead T1, it will suffice at this point to rotate the rim W or the wheel-holder table. Alternatively, one could rotate the device 1.

In order to demount the second bead T2 of the tire as well, one can proceed with conventional devices or tools, e.g. with a lever, or by means of a device in accordance with the present invention, as will be better illustrated below.

During the demounting steps of a portion of a first bead T1 of a tire T, the lever 2 is obliged to follow an insertion path in which the end 2a is substantially adjacent to the rim W, during such course, the extension of the stem 4b of the actuator 4 being commanded, and is obliged to follow a reverse course, in which the end 2a is relatively distant from the rim, the reverse path being different from the insertion path. The reverse course is imparted to the demounting lever 2 after the same has grasped a portion of the bead T1, which is dragged outside or beyond the respective edge W1 of the rim W. As will be understood, the reverse course provides for a first step when the lever 2 is moved away, or better yet when its distal end 2a is moved away from the rim W (step between the operative positions illustrated in FIGS. 6 and 7), and then a second step in which the lever 2 is angularly moved such to be once again brought into rest position (step between the positions illustrated in FIGS. 7 and 8).

Due to such course, a demounting device according to the present invention is able to demount a tire in a much easier manner than the conventional devices. This is the case since, during the insertion step (i.e. during the extension of the stem 4b of the actuator 4), the demounting lever 2 and more particularly the distal end 2a, is situated close to the rim W, while during the extraction step, after having grasped a portion of the bead T1 or T2 of the tire (i.e. during the retraction of the stem 4b of the actuator 4), the distal end 2a is moved away from the rim W and therefore it is able to easily bring the bead T1 or T2 beyond the edge W1: this is particularly true since the edge W1 of the rim W does not block the movement of the lever nor, naturally, the passage of the bead T1 or T2 of the tire T beyond such edge.

With the conventional devices, on the other hand, such as those described above, the movements imparted to the device during the insertion of the demounting lever are identical but reversed with respect to those imparted during the extraction step (after which a portion of the bead is grasped by the lever itself).

Preferably, all of the demounting steps are carried out upon locking the rim of the tired wheel atop a wheel-holder table 19 of a tire mounting-demounting machine.

With a device according to the present invention, it is also possible to demount a second bead T2 of a tire T, whose first bead T1 has already been brought beyond the respective first edge W1 of the rim W. In order to do this, after having demounted the first bead T1 (e.g. as described above or in a conventional manner), the device 1 is brought close to a first flank of the tired wheel and the extension of the stem 4b of the actuator 4 is commanded so as to command the angular movement of the spring shackle element 7 with respect to the support arm (around the axis z-z) or, if it is provided, of the block element 6 as well as the demounting lever 2 with respect to the spring shackle element 7 (around the axis x-x), such that the lever 2 is inserted between a portion of the second bead T2 of the tire T and a portion of the edge W1 of the rim W and (externally) grasps a portion of the second bead T2, at the engagement zone EZ. At this point, the retraction of the stem 4b is commanded, so as to initially cause the angular movement of the demounting lever 2 with respect to the spring shackle element 7, while the spring shackle element 7 remains in position with respect to the block element 6. In such a manner, the free end 2a of the demounting lever 2 is moved away from the edge W1 of the rim W, bringing a portion of the second bead T2 therewith.

By continuing to command the retraction of the stem 4b of the actuator 4, (by overcoming the force of the friction means) the reverse angular movement of the spring shackle element 7 is caused with respect to the block element 6, and an angular movement is caused of the demounting lever 2 (in the same direction imparted during the insertion or penetration step) with respect to the spring shackle element 7, so as to bring the portion of the second bead T2 beyond the first edge W1 of the rim W and the device 1 in the initial position. Also in this case, in order to complete the demounting of the second bead T2, the rim will be rotated (e.g. by rotating the wheel-holder table) or the lever will be rotated.

It should be noted that for an optimal demounting of a second bead T2 of a tire by means of a device according to the present invention, the device is equipped with a drive arm 13.

With reference to FIGS. 15 and 16, a device according to the present invention comprises means for angularly moving the actuator 4, preferably around an axis substantially parallel to the axes y-y, x-x and z-z. Such means can, for example, include a pair of hydraulic or pneumatic jacks 21a, 21b, a first jack 21a intended to command angular movements of the actuator 4 in one direction, and a second jack 21b intended to command angular movements of the actuator 4 in the opposite direction.

The cylinders of the jacks 21a, 21b are mounted at the top of the support element 3, in a manner such that the respective stems engage the bottom of the cylinder 4a, each stem from opposite sides with respect to the pin articulating the cylinder 4a itself to the support element. In such a manner, the extension of a stem of a first jack 21a causes the rotation of the cylinder 4a of the actuator 4 in one direction and the other (of the jack 21b) causes the rotation in the opposite direction.

A fluid feed circuit 22 can be provided for, such as compressed air to the actuator 4 and to the jacks 21a, 21b, which is structured in a manner such that when the extension of the stem 4b of the actuator 4 is commanded, the simultaneous extension of the stem of a first jack 21a is also commanded, which acts on a bottom portion of the cylinder 4a distal from the edge W1 of the rim W on which the device 1 operates. In such a manner, the tip of the stem 4b is angularly moved, and thus the proximal end 2b is moved away from the rotation axis of the tired wheel or rim (in the Figures corresponding with the axis s-s of the wheel-holder table) to be worked and the distal end 2a is inserted between the portion of the bead T1 or T2 and edge W1 of the rim. When the retraction of the stem 4b is commanded, then the extension of the stem of the second jack 21b is commanded (and possibly the retraction of the stem of the jack 21a) so as to command the angular movement of the device 1 and move the tip of the stem 4b, and hence the proximal end 2b, closer to the rotation axis of the tired wheel or rim and to command the reverse movement of the distal end 2a together with the portion of the bead T1.

With reference to the embodiment illustrated in FIGS. 15 and 16, the feed circuit 22 can comprise a fluid source 23, such as compressed air, a first duct 24 intended to place the source 23 in fluid communication with a valve, such as an electric valve 25, a second duct 26 which branches off downstream of the electric valve 25 so as to place the valve 25 in fluid communication with a first jack 21a and with the bottom of the cylinder 4a of the actuator 4, and a third duct 27; also the third duct 27 branches off downstream of the electric valve so as to place the valve 25 in fluid communication with the other jack 21b and with the head of the cylinder 4a of the actuator 4. By head of the cylinder 4a, it is naturally intended the end that delimits the opening or passage for the sliding of the stem 4b, while by bottom it is intended the opposite end of the cylinder 4.

The valve 25 can be moved between at least two positions:
a first position in which it allows the passage of fluid from the first duct 24 to second duct 26 and from the third duct 27 to the atmosphere or to the exhaust; and
a second position in which it allows the passage of fluid from the first duct 24 to the third duct 27 and from the second duct 26 to the atmosphere.

With one such structure, when the valve 25 is in the first position, the feed fluid is fed to the bottom of the cylinder 4a by commanding the extension of the stem 4b of the actuator, as well as to the bottom of the first jack 21a by commanding the extension of the respective stem which engages the cylinder 4, causing the angular movement of the actuator 4 (in counter-clockwise sense in the Figures) with the tip of the stem 4b, and thus the proximal end 2b, moving closer to the edge of the rim and away from the rotation axis of the tired wheel, and the insertion of the distal end between bead portion T1 or T2 and respective edge portion W1 of the rim W. Simultaneously, the fluid (e.g. compressed air) possibly contained in the second jack 21b is discharged.

When, though, the valve 25 is in the second position, the feed fluid (e.g. compressed air) is fed to the second jack 21b and to the head of the cylinder 4a of the actuator 4, by commanding the retraction of the stem 4b and the simultaneous angular movement of the actuator 4 so as to bring the tip of the stem 4b, and thus the proximal end 2b, closer to the rotation axis s-s of the tired wheel, and by commanding the reverse course of the demounting lever 2.

For the demounting of a portion of a first T1 and/or second bead T2 of a tire with a device according to FIGS. 15 and 16, one substantially proceeds as described above, with the difference that:
during the step when the extension of the stem 4b of the actuator 4 is commanded, the angular movement means 21a, 21b cause the angular movement of the actuator 4 in one direction, such to move the tip of the step stem 4b and thus the proximal end 2b away from the rotation axis of the tired wheel; while
during the step when the retraction of the stem 4b is commanded, the angular movement means 21a, 21b cause the angular movement of the actuator 4 in the opposite direction.

Figure 19:
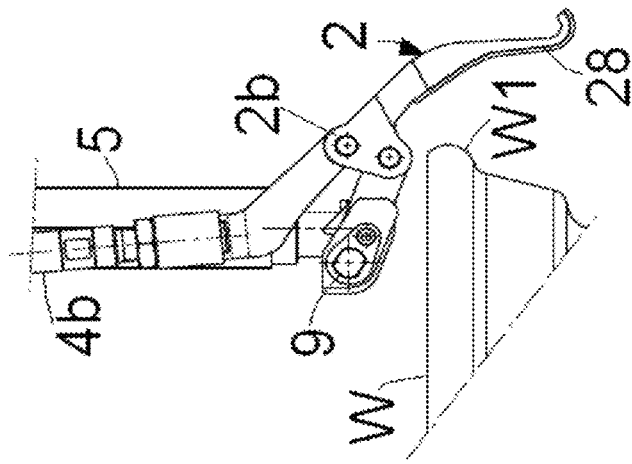
FIGS. 17-19 are views similar to FIGS. 1-3 regarding another demounting device embodiment according to the present invention.
Figure 18:
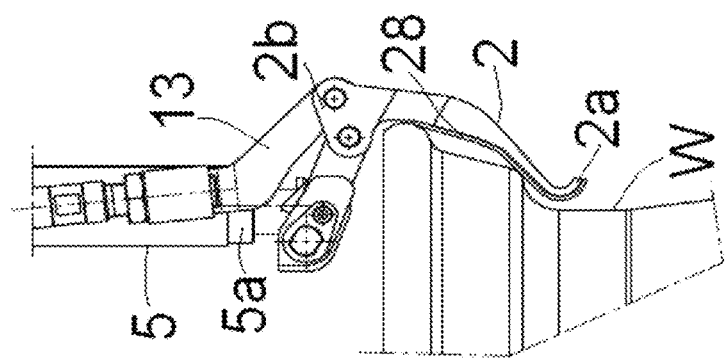
Figure 17:
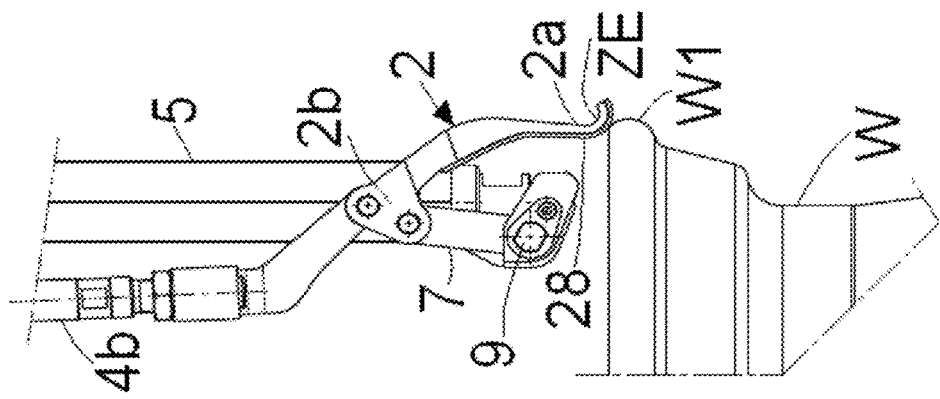
Figure 27:
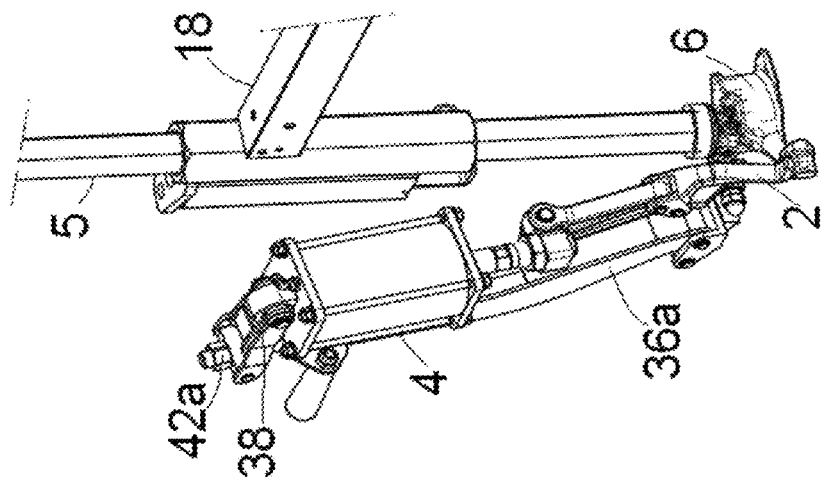
FIGS. 25 to 27 are perspective views of another embodiment of demounting device according to the present invention.
Figure 26:
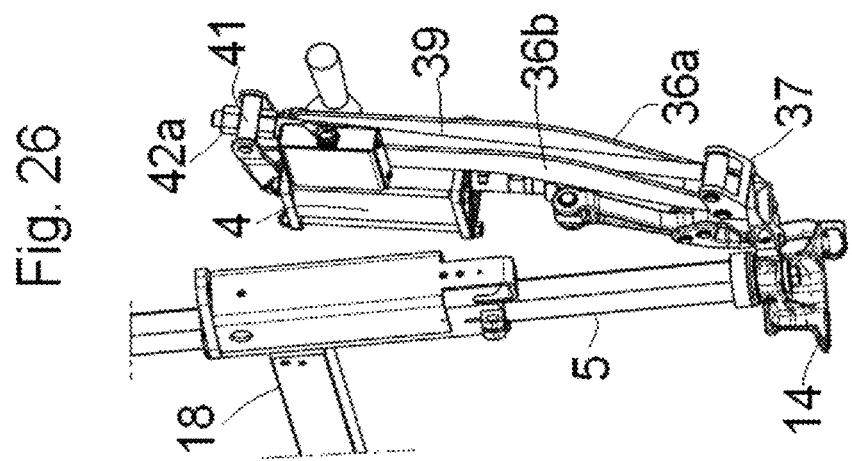
Figure 25:
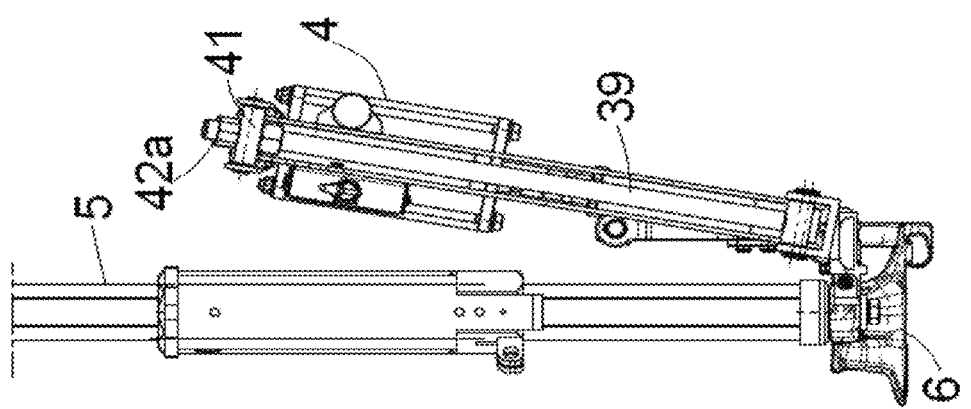

With reference now to the FIGS. 17-19, a demounting device variant 1 is illustrated according to the present invention which comprises a protection element 28 mounted on the face of the lever 2 turned towards the back B, and during use towards the rim. With one such solution, the lever 2 slides directly on the rim W when the extension of the stem 4b of the actuator 4 is commanded, and the protection element 28 ensures that the rim will not be ruined after such sliding.

According to such variant, it is therefore not necessary to have the protuberance 6a.

With reference now to FIGS. 20-24, another demounting device embodiment is illustrated according to the present invention similar to the embodiment illustrated with reference to FIG. 1, but which does not have spacer member 12. Instead, this embodiment is equipped with a pin element or articulation pin 29 borne by the work end 5a of the support arm 5, and if a block element 6 is provided for, the pin 29 is fixed thereon, preferably on a surface opposite that where the mounting tool 14 is provided for.

The pin element 29 has a substantially tubular body fixed to the block element 6, from which respective projections 30a, 30b extend, preferably from diametrically opposed positions.

The spring shackle element 70, on the other hand, can have two sections 70c, 70d substantially parallel to each other and to the support arm 5, but offset from each other, such that the section 70c, lower during use, is closer to the support arm 5 than the upper section 70d. According to the illustrated embodiment, the two sections 70c and 70d are connected by means of a tilted section 70e.

If the pin element 29 has projections 30a, 30b, then an embossed element 31 is provided for, projecting from the spring shackle element 70 in the direction of the support arm 5. When the lever 2 is in initial work position, the embossed element 31 is substantially close to a first projection 30b (upper projection in the Figures), while following the extension of the stem 4b of the actuator 4, the lever 2 is angularly moved and the angular movement of the spring shackle element 70 can also be commanded until the embossed element 31 abuts against the second projection 30a. The projections 30a and 30b, in particular the projection 30a, in substance carry out the function of confinement means or end stop of the angular movement of the spring shackle element 7.

According to such embodiment, the spring 8 can be mounted between the pin element 29 and the respective portion of the spring shackle element 70, so as to oppose the angular movements of the spring shackle element 70 with respect to the support arm 5.

In order to prevent an operator from inadvertently placing a finger between the projections 30 and embossed element 31, risking injury during operation, a guard element 32 can also be provided for, constrainable to a projection 30b by means of a respective screw 33.

A demounting device according to the present invention can also comprise means for articulating or pivoting the stem 4b of the tool 4 to the drive arm 13, preferably around an axis t-t substantially orthogonal to the axes y-y, x-x and z-z 15 and to the longitudinal axis of the stem 4b.

Due to such expedient, the assembly of a mounting device according to the present invention on a tire mounting-demounting machine is simpler, and it can also be easily installed or bound to tire mounting-demounting machines that are even quite different from each other.

More particularly, according to such variant, the upper end (upper during use) 15a of the drive arm 15 has a fork-like configuration and in its prongs, respective holes 15b are obtained, while the lower end of the stem 4b can be inserted in a sleeve element 34 in which a hole 34a is obtained. The stem is pivoted to the drive arm 15 by means of a pin 35, which during use is inserted in the aligned holes 15a and 34a.

In the embodiment of demounting device of FIGS. 25 to 29, the actuator 4 is carried by a support component, e.g. a section bar or a pair of sheets 36a, 36b upwardly extending from the block element 6.

More particularly, a first cradle or fork element 37 is connected to the block element 6, preferably to the back thereof (i.e. to a portion of the block element facing opposite to the protuberance 6a and the mounting tool 14), and the profile component or pair of sheets 36a, 36b at one lower end thereof are pivoted to the fork element 37 about an axis w-w parallel to the articulation axes x-x and y-y. The sheets 36a, 36b preferably have a substantially vertical trim, and support at the upper end thereof a plate or fork component 38 pivoted to the upper end of the cylinder of the actuator 4.

A tie rod 39 is also provided, which at one lower end thereof is articulated to the cradle or fork element 37 about an axis k-k parallel to the articulation axes x-x and y-y, whereas at its upper end it is anchored to the plate or fork component 38 or to the support component 36a, 36b.

Advantageously, the upper end of the tie rod 39 is engageable in a bore 40a formed in a pivoting cross-member 41 articulated to the plate or fork component 38 or the support component 36a, 36b, and securable in position by means of nuts 42a, 42b arranged at opposite sides with respect to the cross-member 41. By controlling the screw engagement of the tie rod 39 the tilting thereof and thus of the actuator 4 can be adjusted.

The demounting device of FIGS. 25 to 29 can be assembled or disassembled in a very simple and rapid way to any type of tire assembling-disassembling machines provided with a block element 6, since it is entirely anchored to, and supported by, the block element 6, whereas in the previously-described embodiment the actuator is anchored to the top of the support element 3.

As will be understood, a device according to the present invention allows easily and quickly demounting one or both beads of a tire from a rim, without however requiring particular sagacity or ability of the operator set to carry out such demounting operations.

A demounting device according to the present invention also has a simple structure and is equipped with a reduced number of components.

The bead breaker group described above is susceptible to numerous modifications and variants within the protective scope defined by the contents of the claims.

Thus, for example, the device could be mounted on a tire mounting-demounting machine having a wheel-holder table with rotation axis that is substantially horizontal or tilted with respect to the vertical.

Alternatively, the device might not be mounted on a tire mounting-demounting machine, but it could be separated therefrom, e.g. fixed to a wall or on its own support column.

The invention claimed is:

1. A device for demounting a tire from a rim, comprising:
   at least one support element;
   an articulation pin element borne by said at least one support element;
   a spring shackle element having a first end and a second end articulated on said articulation pin;
   a demounting lever having a substantially hook-like distal end and a proximal end that can be articulated at a first articulation axis to said first end of said spring shackle element and at a second articulation axis parallel to the first articulation axis, said first and said second articulation axis being substantially parallel to said articulation pin; and
   an actuator borne by said at least one support element and set to act on said second articulation axis of said demounting lever in order to make said demounting lever angularly move during use around said first articulation axis and make said spring shackle element angularly move around said articulation pin, such that after the driving of said actuator in one direction, said lever is obliged to follow a first path or insertion path, while by driving said actuator in the reverse direction, said demounting lever is obliged to follow a reverse or extraction path, different from said first path;

comprising elastic loading means at the articulation around said articulation pin of said second end of said spring shackle element, designed to slow the angular movement of said spring shackle element around said articulation pin with respect to its angular movement around said first axis.

2. A device according to claim 1, wherein the part of said demounting lever between said first and said second end is substantially free or lacking constraints.

3. A device according to claim 1, wherein said at least one support element comprises a support arm having a work end positionable at a flank of a rim and that said articulation pin element is brought to the work end of said support arm.

4. A device according to claim 1, wherein said articulation pin is fixed on said support element, and in that said elastic loading means comprise a spring mounted between the pin element and the respective portion of said spring shackle element.

5. A demounting device according to claim 1, comprising a spacer member between the second end of said spring shackle element and said support element, the spacer member having fork-like cavity for the articulation of said second end.

6. A demounting device according to claim 5, wherein said articulation pin can be inserted both through said fork-like cavity of said spacer member and through said support element, and said elastic loading means comprise at least one spring mounted around said articulation pin and maintained tight against it, said spring being intended to oppose angular movements of said spring shackle element with respect to said support element.

7. A device according to claim 1, wherein said at least one support element comprises a support arm supporting a block element, said second end of said spring shackle element being articulated to said block element.

8. A device according to claim 7, wherein said block element comprises a protuberance which is extended towards said lever and substantially transversely thereto, such that said lever, in rest conditions, is based on said protuberance, while during the extension of said stem of said actuator, it slides on said protuberance.

9. A device according to claim 7, comprising at least one mounting tool being extended from said block element.

10. A device according to claim 7, comprising a support component upwardly extending from said block element and designed to support said actuator.

11. A device according to claim 10, comprising a first cradle or fork element connected to said block element, said support component at one lower end thereof being pivoted to said cradle or fork element about an axis parallel to said first and second articulation axes, and at the upper end thereof supporting a plate or fork component pivoted to the upper end of the cylinder of said actuator, said device further comprising a tie rod, which at one lower end thereof is articulated to said cradle or fork element about an axis parallel to said first and second articulation axes, whereas at its upper end it is anchored to said plate or fork component or to said support component.

12. A device as claimed in claim 11, wherein the upper end of said tie rod is engageable in a bore formed in a pivoting cross-member articulated to said plate or fork component or said support component, and by controlling a screw engagement of said tie rod the tilting thereof and thus of said actuator can be adjusted.

13. A device according to claim 1, comprising means for angularly moving said actuator.

14. A device according to claim 13, wherein said movement means include a pair of jacks, a first jack intended to command angular movements of said actuator in one direction, and a second jack intended to command angular movements of said actuator in the opposite direction.

15. A device according to claim 14, comprising a circuit for feeding fluid to said actuator and to said jacks, comprising a fluid source, a first duct intended to place said source in fluid communication with a valve, a second duct intended to place said valve in fluid communication with said first jack and with the bottom of said cylinder of said actuator, and a third duct intended to place said valve in fluid communication with the other jack and with the head of said cylinder of said actuator, said valve being able to be moved between at least two positions:

a first position in which it allows the passage of fluid from said first duct to said second duct, and from said third duct to the atmosphere or to the exhaust; and a second position in which it allows the passage of fluid from said first duct to said third duct and from said second duct to the atmosphere.

16. A device according to claim 1, comprising at least one protection element mounted on the face of said lever turned towards the back of said device, i.e. the face turned towards said rim during use.

17. A device according to claim 1, comprising one drive arm which is pivoted on one side to said actuator and on the other side to said proximal end of said lever.

18. A device according to claim 17, wherein said proximal end is configured as a fork, between whose prongs a respective portion of said drive arm is housed and anchored during use.

19. A device according to claim 17, comprising means for articulating or pivoting said actuator to said drive arm.

20. The device of claim 1, further comprising a base, a wheel-holder table rotatable around a rotation axis supported by said base, a column extending from said base and supporting at least one tool-holder arm, wherein said support element is supported by said tool-holder arm.

21. A process for demounting a tire from a rim, comprising the following steps:

providing a device for demounting a tire from a rim, comprising:

at least one support element;

an articulation pin element borne by said at least one support element;

a spring shackle element having a first end and a second end articulated on said articulation pin;

a demounting lever having a substantially hook-like distal end and a proximal end that can be articulated at a first articulation axis to said first end of said spring shackle element and at a second articulation axis parallel to the first articulation axis, said first and said second articulation axis being substantially parallel to said articulation pin; and an actuator borne by said at least one support element and set to act on said second articulation axis of said demounting lever in order to make said demounting lever angularly move during use around said first articulation axis and make said spring shackle element angularly move around said articulation pin, such that after the driving of said actuator in one direction, said lever is obliged to follow a first path or insertion path, while by driving said actuator in the reverse direction, said demounting lever is obliged to follow a reverse or extraction path, different from said first path;

elastic loading means at the articulation around said articulation pin of said second end of said spring shackle element, designed to slow the angular movement of said spring shackle element around said articulation pin with respect to its angular movement around said first axis, bead breaking a first bead of the tire;

arranging said demounting device at a first flank of said rim corresponding with said first bead, so as to bring said distal end of said demounting lever to a first edge of said rim;

commanding said linear actuator, so as to determine an angular advancement course of said demounting lever towards a position of penetration of its distal end between the edge of the rim and the tire, until it internally engages a portion of the tire bead close to the rim at the advancement end stop, and to carry out a reverse course in order to deform a portion of the tire bead, moving it away from the edge of the rim before dragging it off the rim for the demounting, said advancement course being different from said reverse course; and completing the demounting by rotating said rim or said device.

22. A process according to claim 21, wherein said step in which said linear actuator is commanded comprises the following steps:

commanding said actuator in one direction so as to angularly move said spring shackle element around said articulation pin and move said lever around said first axis, such that said lever is inserted between the tire and the rim and grasps a respective portion of said first bead;

commanding said actuator in the reverse direction so as to:
initially cause the angular movement of said lever around said first axis, while said spring shackle element remains in position with respect to said support element, such that the free end of said lever is moved away from said edge of said rim, bringing the grasped portion of said first bead therewith, and then cause the reverse angular movement of said spring shackle element around said articulation pin and the return of said lever into initial position;

so as to bring a portion of said first bead beyond the respective edge of said rim and the device in the initial position.

23. A process according to claim 21, wherein is achieved by means of a device comprising means for angularly moving said actuator, wherein:

during said step in which the extension of said stem is commanded, said angular movement means cause the angular movement of said actuator in one direction; and during said step in which the retraction of said stem is commanded, said angular movement means cause the angular movement of said actuator in the opposite direction.

24. A process according to claim 21 and achieved by means of a device wherein said at least one support element comprises a support arm supporting a block element, said second end of said spring shackle element being articulated to said block element, and wherein said block element comprises a protuberance which is extended towards said lever and substantially transversely thereto, such that said lever, in rest conditions, is based on said protuberance, while during the extension of said stem of said actuator, it slides on said protuberance, wherein:

when said device is brought close to said first flank of said rim, said protuberance is abutted against a portion of said edge of said rim; and during said step in which the extension of said stem is commanded, said lever slides on said protuberance.

25. A process according to claim 21, wherein:

when said device is brought close to said first flank of said rim, said lever is abutted against a portion of said edge of said rim; and during said step in which the extension of said stem is commanded, said lever slides on said rim.

* * * * *